May 24, 1932. W. M. HIKE ET AL 1,860,179
DIRECTION INDICATOR FOR AUTOMOBILES
Filed April 5, 1930 2 Sheets-Sheet 2
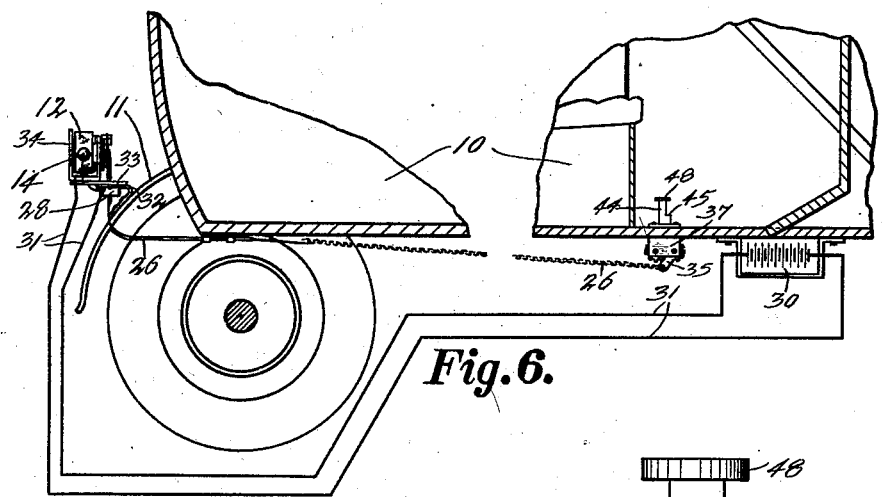
Fig.6.
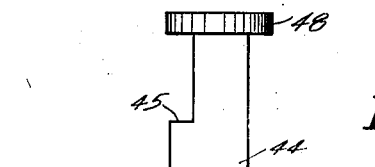
Fig.7.
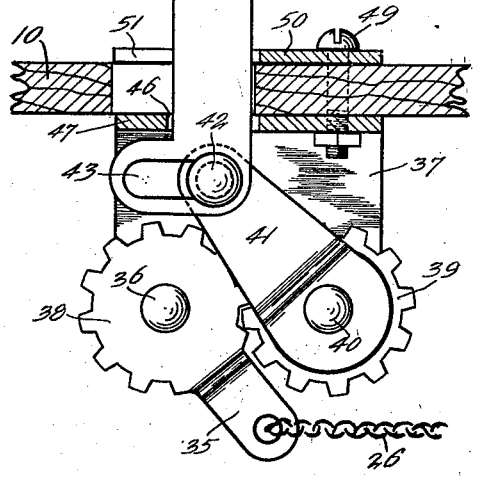
Fig.8.
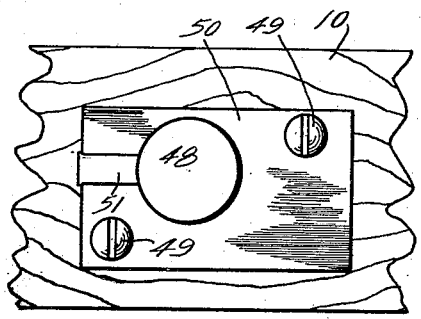
Inventor
W.M.Hike
W.J.B.Kast
By Arthur H. Sturges
Attorney Patented May 24, 1932

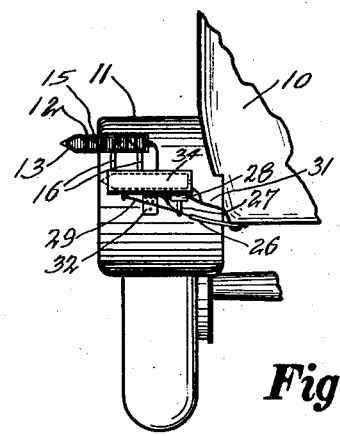
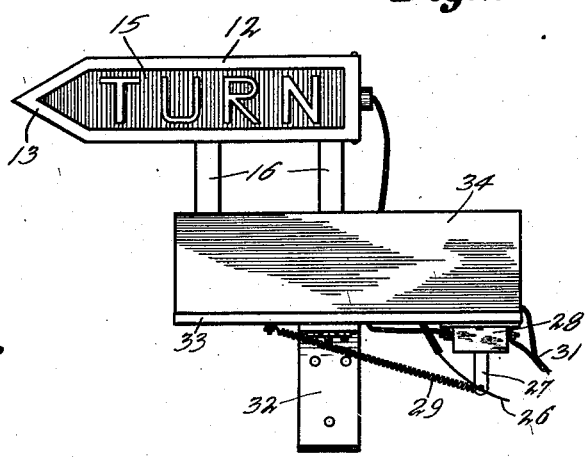
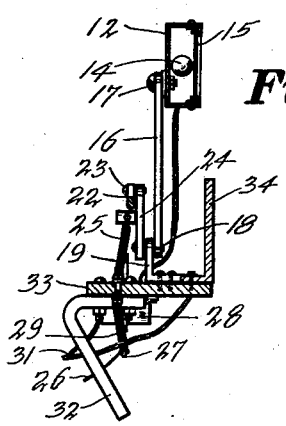
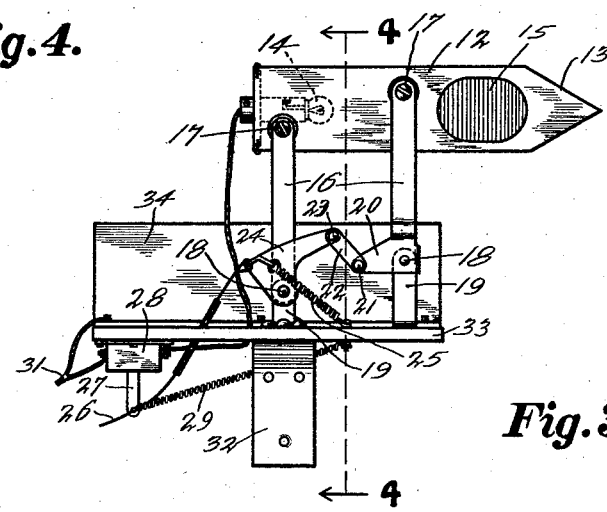
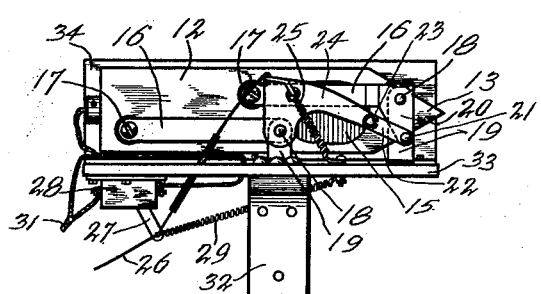

1,860,179

UNITED STATES PATENT OFFICE

WILLIAM M. HIKE, OF OMAHA, AND WILBER J. B. KAST, OF BELLEVUE, NEBRASKA

DIRECTION INDICATOR FOR AUTOMOBILES

Application filed April 5, 1930. Serial No. 441,952.

The present invention relates to improvements in vehicle signals, and has for an object to provide a device for announcing an intended change in direction to the left at street intersections.

Another object of the present invention is to provide an indicating device adapted to be supported, for instance, upon the rear fender of an automobile, and having a pivotal movement to enable the indicator to shift to a variety of positions for showing proposed changes in direction and to announce the intention of the driver to stop the vehicle.

A further object of the invention is to provide an economical construction which is visible clearly by day and by night.

A still further object of the invention is to simplify the construction of signals of this class, to provide a signal which is easily and conveniently operated and yet will not occupy a great amount of room on the vehicle, which is capable of being attached to existing vehicle constructions without requiring changes or alterations therein, and to provide a signal which may be illuminated at night only upon its movement from its normal state of rest.

The invention also aims to provide a pivotally mounted signal which is normally concealed behind an obstruction or shield and the rear side of which is adapted to be readily visible in the daylight for directing attention to the signal upon its upward swinging movement into indicating position.

With the foregoing and other objects in view, the invention will be more fully described hereinafter, and will be more particularly pointed out in the claim appended hereto.

In the drawings, wherein like symbols refer to like or corresponding parts throughout the several views.

Figure 1 is a rear elevation of a rear corner of an automobile, showing the new device of this invention applied thereto.

Figure 2 is a detail enlarged rear elevation of the new signal in a raised or indicating position.

Figure 3 is a like view in front elevation, showing the opposite side of the signal.

Figure 4 is a transverse section taken substantially on the line 4—4 of Figure 3, and looking in the direction of the arrows.

Figure 5 is a rear elevation of the signal in normal collapsed position.

Figure 6 is a fragmentary longitudinal section through the body of an automobile, showing the signal and its operating means constructed according to the present invention applied thereto.

Figure 7 is a detail enlarged side elevation reverse to the showing in Figure 6, of the mechanical operating mechanism employed, and Figure 8 is a top plan view of the same mounted on the floor of the vehicle.

Referring now more particularly to the drawings, wherein like numerals refer to like or corresponding parts throughout the several views, 10 designates the body of an automobile provided with a rear left fender 11, upon which the new signal is mounted.

The new signal comprises a casing or housing 12 of general arrow shape, the outer end of which is preferably pointed as at 13 in simulation of an arrow.

As best shown in Figure 4, the interior of the housing 12 is provided with an electric lamp 14 and, as best shown in Figures 2 and 3, the side wall of the housing is provided with a transparent pane 15 of glass or the like, and there may be a transparent pane 15 in each side of the housing or indicator 12, the rear pane being relatively large and having etched thereon suitable indicia, such as the word "Turn".

The housing 12 is carried by arms or links 16 which are pivotally secured to the housing by pivots 17. The lower ends of the arms 16 are connected by pivots 18 to standards or brackets 19.

One of the arms or links 16 is provided on its lower end with a bell crank extension 20 which is pivotally connected at 21 to a link 22, which in turn is pivotally connected at 23 to the free end of a second bell crank 24. The bell crank 24 is pivotally supported on the pivot 18.

The bell crank 24 is provided with a spring 25 for holding the housing 12 in raised position at times when said spring 25 is swung past the "dead center" of the pivot 18, as shown in Figure 3.

As best shown in Figure 5, the signal, when in the collapsed position, is adapted to be raised by means of a wire or similar flexible connector 26 which is carried to a lever 27 of an electric switch 28, the said lever 27 being maintained in a normal circuit open position by a spring 29.

By the foregoing means it will be understood that when the wire 26 is pulled it will thereby cause the signal housing or indicator 12 to be moved into a raised position, as shown in Figure 3, from its normal position of rest such as shown in Figure 5.

Referring now to Figure 6, a battery 30 is carried by the automobile 10 and connected by electric wires 31 to the switch 28 carried by the signal for lighting the lamp 14 within the housing 12, the said switch 28 being a part of the circuit thus formed.

The signal is mounted on the fender 11, or on any other suitable part of the vehicle 10, by an attaching bracket 32 which carries a base plate from the rear edge of which rises a shield plate 34. The vertical brackets 19 which carry the indicator 12 rise from the base plate 33 in spaced relation to and in front of the shield plate 34 so that when the indicator is collapsed it will be hidden from rear view by the shield.

It will be understood that when the indicator 12 is in lowered position, as shown in Figure 5, the switch 28 is open and the circuit also open. It will be further understood that when the housing or indicator 12 is raised the switch lever 27 will be actuated at the same time for closing the electric circuit and causing the lamp 14 to be lighted and illuminate the housing 12 and the glass 15.

The heretofore mentioned flexible element or connector 26 may also include a chain portion which extends forwardly of the vehicle 10 as shown in Figure 6 and which is connected to an arm 35.

The arm 35 is mounted on a pivot 36 carried by a bracket plate 37. The arm 35 projects from a pinion 38 which meshes with a second pinion 39 on a pivot 40 also on the bracket plate 37. The pinion or gear 39 is secured to an arm 41 having a laterally extending pin 42 which rides in a slot 43 extending at right angles in the lower end of an operating lever 44.

The lever 44 is provided with an upwardly facing shoulder 45 adapted to engage the edge of a slot 46 in the flange 47 of the bracket plate 37 when the lever 44 is depressed.

A button 48 is provided on the upper end of the lever 44. The flange 47 provides a bottom floor plate which is secured to the floor boards of the automobile 10 by one or more bolts 49, and a top floor plate 50 is provided for the upper side of the floor board and has a slot 51 through which the operating lever 44 may operate.

In the operation and use of the invention, all parts thereof are normally at rest as shown in Figure 6. To give a signal for turning the operator places his heel on the button 48 and depresses the lever 44 which, through the pinions or gears 39 and 38, draws the flexible connector 26 forwardly and swings the bell crank lever 24 upwardly on its pivot 18. The free end of the bell crank lever 24 pulls the link 22 which in turn swings the arm or link 16 into raised position. The parts of the signal are thus moved from the position shown in Figure 5 into the position shown in Figure 3. The indicator 12 is thus raised into view from behind the shield plate 34, the switch 28 is closed and the word "Turn" will be illuminated and exposed to view.

If so desired, the operator may lock the lever 44 in depressed position by rocking it forwardly when depressed to interlock the shoulders 45 and 46, when the operator desires to use both feet for the clutch and brake. After having made the turn, the lever 44 is released and the signal returns to normal position under the action of the springs 25 and 29.

From the foregoing description it is thought to be obvious that a direction indicator for automobiles constructed in accordance with this invention is particularly well adapted for use by reason of the convenience and facility with which it may be assembled on the vehicle and operated, and it will also be obvious that the invention is susceptible to various changes and modifications without departing from the principle and spirit thereof, and for this reason it is not wished to be understood as limiting the invention to the precise arrangement and formation of the several parts herein shown in carrying out our invention in practice except, as hereinafter claimed:

What is claimed is:—

A vehicle signal, comprising a bracket for attachment to a vehicle, a shield plate carried by the bracket and extending upwardly at the rear edge thereof, a pair of arms mounted on the bracket in spaced relation to said shield and disposed in rear thereof, a link pivoted on the upper end of each arm, an elongated indicator pivotally mounted upon the outer ends of said links in parallelogram relation thereto and to the bracket, said links adapted to swing downwardly behind said shield to dispose the indicator in back of the same, a bell crank lever mounted on one of said arms, a link between said bell crank lever and the other arm for causing the arms to move simultaneously and equally, a spring disposed between the bell crank lever and the bracket for normally urging the links to swing into a lowered position behind the shield, and manually operable means connected to the bell crank lever for moving the same against the tension of said spring to raise said arms and the indicator when desired.

In testimony whereof, we affix our signatures.

WILLIAM M. HIKE.
WILBER J. B. KAST.